(12) United States Patent
Frachioni

(10) Patent No.: US 11,701,814 B2
(45) Date of Patent: Jul. 18, 2023

(54) METHOD FOR ADJUSTING PRINTING OPERATIONS IN A DIRECT-TO-OBJECT PRINTER HAVING LIMITED DROP SIZE VARIATION PRINTHEADS

(71) Applicant: Xerox Corporation, Norwalk, CT (US)

(72) Inventor: Martin L. Frachioni, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/055,714

(22) Filed: Nov. 15, 2022

(65) Prior Publication Data

US 2023/0069941 A1 Mar. 9, 2023

Related U.S. Application Data

(62) Division of application No. 16/944,817, filed on Jul. 31, 2020, now Pat. No. 11,518,085.

(51) Int. Cl.
| | |
|---|---|
| *B29C 64/112* | (2017.01) |
| *B29C 64/209* | (2017.01) |
| *B29C 64/241* | (2017.01) |
| *B29C 64/393* | (2017.01) |
| *B29C 64/264* | (2017.01) |
| *B29C 64/236* | (2017.01) |
| *B33Y 50/02* | (2015.01) |
| *B33Y 10/00* | (2015.01) |
| *B33Y 30/00* | (2015.01) |

(52) U.S. Cl.
CPC .......... *B29C 64/112* (2017.08); *B29C 64/209* (2017.08); *B29C 64/236* (2017.08); *B29C 64/241* (2017.08); *B29C 64/264* (2017.08); *B29C 64/393* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 9,333,741 B2 | 5/2016 | Nick et al. | |
| 9,975,327 B1 | 5/2018 | Yang et al. | |
| 10,214,026 B1 | 2/2019 | Jaskowiak et al. | |
| 2002/0097280 A1 | 7/2002 | Loper et al. | |
| 2005/0178279 A1 | 8/2005 | Valls | |
| 2006/0144261 A1 | 7/2006 | Uptergrove | |
| 2009/0169719 A1 | 7/2009 | Orr | |
| 2011/0012952 A1 | 1/2011 | Chang et al. | |
| 2014/0225953 A1 | 8/2014 | Robinson et al. | |

*Primary Examiner* — Jacob T Minskey
*Assistant Examiner* — Adrien J Bernard
(74) *Attorney, Agent, or Firm* — Maginot Moore & Beck LLP

(57) ABSTRACT

A method of operating a direct-to-object printer adjusts a pixel density of a portion of contone image data for an image to be printed on a surface of a tapered object. The contone image data is also filtered with a stochastic halftone filer to produce binary image data for the image to be printed on the tapered object. The adjustment in the pixel density for the portion of the image to be printed on the portion of the object having a circumference that is different than another portion of the surface at the uppermost portion of the image produces a more uniform appearance in the resulting printed image.

20 Claims, 4 Drawing Sheets

METHOD FOR ADJUSTING PRINTING OPERATIONS IN A DIRECT-TO-OBJECT PRINTER HAVING LIMITED DROP SIZE VARIATION PRINTHEADS

PRIORITY CLAIM

This application is a divisional application that claims priority to U.S. patent application Ser. No. 16/944,817, which is entitled "System And Method For Adjusting Printing Operations In A Direct-To-Object Printer Having Limited Drop Size Variation Printheads," which was filed on Jul. 31, 2020, and which issued as U.S. Pat. No. 11,518,085 on Dec. 6, 2022.

TECHNICAL FIELD

This disclosure relates generally to a system for printing on three-dimensional (3D) objects, and more particularly, to systems that print on objects having tapered sides and sides of different circumferences.

BACKGROUND

Commercial article printing typically occurs during the production of the article. For example, ball skins are printed with patterns or logos prior to the ball being completed and inflated. Consequently, a non-production establishment, such as a distribution site or retail store, for example, in a region in which potential product customers support multiple professional or collegiate teams, needs to keep an inventory of products bearing the logos of various teams followed in the area. Ordering the correct number of products for each different logo to maintain the inventory can be problematic.

One way to address these issues in non-production outlets is to keep unprinted versions of the products, and print the patterns or logos on them at the distribution site or retail store. Printers known as direct-to-object (DTO) printers have been developed for printing individual objects. Operating these printers with known printing techniques, such as two-dimensional (2D) media printing technology, to apply image content onto three-dimensional objects produces mixed results. As long as the surface of the objects are relatively flat, the images are acceptable. However, many products, such as cups, tumblers, and the like, have tapered surfaces, which adversely impact the printed image quality. As used in this document, the word "tapered" means a surface that varies in circumference in a cross-process direction for the printing of the object. To print these types of objects, the printhead is positioned so it is parallel to the surface of the object being printed as shown in FIG. 3. Alternatively, a tapered object can be tilted so the face of the printhead(s) are parallel to the tapered object surface. As the object is rotated about its longitudinal axis, the printhead is operated at a predetermined frequency to print lines of ink drops on the object. The separation of the printed ink drops along a projection of the longitudinal axis of the object on the exterior of the object is determined by the predetermined distance separating the inkjets in the printhead in that direction. As used in this document, the term "process direction" means a direction of rotation past the printhead and the term "cross-process direction" means a direction along the surface of the object that joins the longitudinal axis at the opposite ends of the object. In this example, the frequency of inkjet firing determines the resolution of the image in the process direction and the distance between the inkjets in the cross-process direction determines the most coarse resolution in the cross-process direction. In some printing systems, the printhead is moved in the cross-process direction by a predetermined distance to increase the resolution of the image in the cross-process direction. For example, the inkjets in the printhead of FIG. 3 are operated at a frequency that produces a process direction resolution of 750 dpi and a resolution in the cross-process direction of 75 dpi. By moving the printhead in the cross-process direction by $\frac{1}{600}^{th}$ of one inch following each complete revolution of the first seven revolutions in an eight revolution printing process, the resolution is increased to 600 dpi in the cross-process direction since eight groups of 75 dpi lines are printed within an inch without overlap. Thus, the final resolution in this example produces an image with a resolution of 750 dpi in the process direction and 600 dpi in the process direction.

With known 2D printing processes, the density of the ink image, which can be measured in drops per inch (dpi) or mass per unit area, on the portions of the product having the larger circumference varies significantly from those having a lesser circumference. This problem arises because a greater area of the object rotates past the printhead while the smaller circumference also rotates past the printhead. Thus, the portion having the larger circumference is moving at a greater angular velocity than the smaller circumference portion. Consequently, the same amount of ink is distributed over a greater area at the larger circumference portion than the smaller circumference portion. This distribution differential produces a less dense image at the larger circumference portion than the density of the image at the smaller circumference portion. If the desired image is supposed to be uniform in density, then the printed image differs from the desired image. An example of this phenomenon is depicted in FIG. 4A, which is a 2D uniform image to be printed on a tapered object, and FIG. 4B, which shows the resulting image printed on the object.

One method of addressing this issue is presented in U.S. Pat. No. 9,333,741. The system in that document uses a printhead having two rows of inkjets extending in the cross-process direction with each row having 500 inkjets. The two rows are offset from one another in the cross-process direction and separated from each other in the process direction by a constant distance. By timing the firing of the inkjets in one row so it ejects ink drops between the drops ejected by the other row, a single line in the cross-process direction having a pixel density of 360 dpi can be obtained. When the circumference changes in the cross-process direction, the timing for the firing of the inkjets in the second line has to be adjusted to produce the single line. This timing parameter is calculated using the printing frequency and the difference between the circumference of the object opposite the inkjet and the circumference of the object at the uppermost end of the image region. Then, the system reduces the pixel density within a single line by a percentage density and compares the reduced pixel density to eight volumes for the ink drops that can be ejected by the inkjet to select an appropriate ink drop volume. Thus, the problem of printing on tapered objects is solved by adjusting the timing of the firing of the inkjets in the second row of inkjets and by increasing the drop volumes in the area where less pixel density occurs or by decreasing the drop volumes were high pixel density occurs. The printhead used in this system incorporates this wide range of ink drop volume control because the printhead has a relative low resolution in the cross-process direction and this system is configured to print an image on the object in a single revolution of the object. Consequently, this system uses ink drop volume variation to adjust pixel density in different areas of the image on the object in an effort to make regions printed with different drop sizes appear to be uniform to the human eye when in fact it does not truly have a uniform image density over the entire printed region.

Unfortunately, the solution presented in this system cannot be used in the DTO printer discussed previously that prints images with a resolution of 750 dpi (process direction) by 600 dpi (cross-process direction). This DTO system prints high resolution images without varying the ink drop volumes. Since the inkjets in this type of DTO printer cannot alter pixel density for an inkjet using a wide range of ink drop volumes, the approach of U.S. Pat. No. 9,333,741 is not useful for this type of system. Therefore, a printing process control system that produces quality images for products having varying circumference diameters using printheads having little or no ink drop volume regulation would be beneficial.

SUMMARY

A new direct-to-object (DTO) printing system using printheads having little or no ink drop volume regulation is configured to produce ink images having a uniform density on tapered or other circumference varying objects. The printing system includes at least one printhead, the printhead being configured to eject marking material, a support having a first end and a second end, the at least one printhead being positioned opposite the support and between the first end and the second end of the support, a holder configured to hold an object and to move along the support between the first end and the second end of the member, an actuator operatively connected to the holder, the actuator being configured to move the holder and an object within the holder along the support to a position opposite the at least one printhead and to rotate the object, and a controller operatively connected to the at least one printhead and the actuator. The controller is configured to operate the actuator to move the holder and the object with the holder to the position opposite the at least one printhead, to operate the actuator to position a face of the at least one printhead parallel to a surface of an object to be printed that has a varying circumference and to rotate the object, to modify contone image data to adjust a pixel density of an image to be printed on the surface of the object, to produce binary image data using the modified contone image data and a stochastic halftone filter, and to operate inkjets within the at least one printhead using the binary image data to form an image on the object with the varying circumference as the object rotates.

A method of operating a DTO printer using printheads having little or no ink drop volume regulation produces ink images having a uniform density on tapered or other circumference varying objects. The method includes operating with a controller an actuator operatively connected to a holder to move the holder and an object having a varying circumference within the holder to a position opposite at least one printhead in the printing system, operating with the controller the actuator to position a face of the at least one printhead parallel to a surface of an object and to rotate the object, modifying with the controller contone image data of an image to be printed on a surface of the object to adjust a pixel density of the image to be printed on the surface of the object, filtering with the controller the modified contone image data using a stochastic halftone filter to produce binary image data, and operating inkjets within the at least one printhead using the binary image data to form an image on the object with the varying circumference as the object rotates.

BRIEF DESCRIPTION OF THE DRAWINGS

The foregoing aspects and other features of a printing system that prints uniform density ink images on tapered surfaces of 3D objects are explained in the following description, taken in connection with the accompanying drawings.

DETAILED DESCRIPTION

Figure 1:
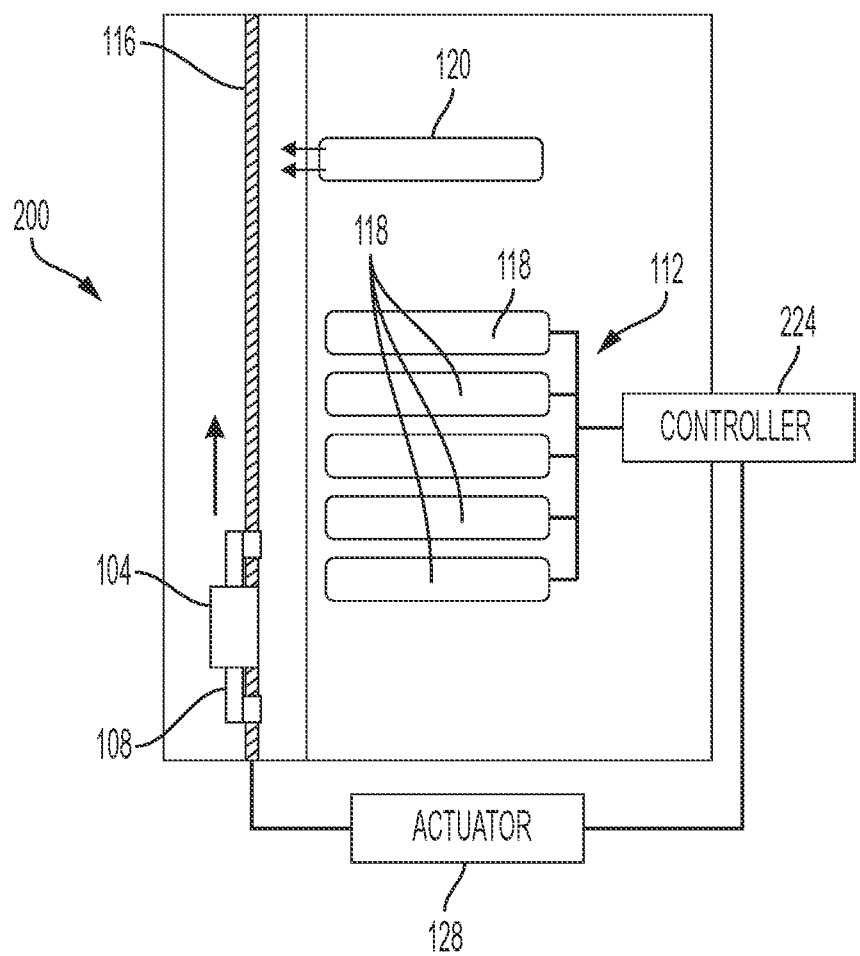
FIG. 1 is a schematic diagram of a side view of a printing system configured to process contone data of an image to be printed so the resulting processed data adjusts the operation of the printheads in the printer for printing images on objects with varying circumferences.

For a general understanding of the present embodiments, reference is made to the drawings. In the drawings, like reference numerals have been used throughout to designate like elements.

A printer 100 shown in FIG. 1 has been configured to process contone image data of an image to be printed on an object having a varying circumference to adjust the operation of the one or more printheads so a more uniform density image is produced. Printer 100 includes printheads 118 in an array 112, a UV lamp 120, a member 116, and a holder 108 for objects 104. While an array of printheads is depicted in FIG. 1, only one printhead is provided in some embodiments. In embodiments having multiple printheads, each printhead can eject a single color of ink, while in embodiments having only one printhead, the printhead can be configured to eject multiple colors of ink. Either the printheads or the holder 108 or both are configured to orient the surface of an object 104 mounted to a holder 108 parallel to the faces of the printheads 118 as the holder 108 holds the object in front of the array 112 of one or more printheads 118. The controller operates an actuator 128 to move the holder 118 along the support 116, which can be a pole, a beam, a rod, or the like, so the object 104 in the holder 108 can be printed and then treated before being ejected from the printer 100. For example, if one or more of the printheads 118 in the array 112 ejects ultraviolet (UV) ink, the UV lamp 120 is operated by controller 124 to cure the UV ink. Controller 124 is configured to operate the one or more printheads in the array 112 to eject marking material onto the surface of the object 104. Latches 132 attach the holder 108 to the member 116. The controller 124 is operatively connected to an actuator 122 to move the one or more printheads in the cross-process direction so multiple printing passes can be performed to increase the resolution of the image in the cross-process direction as described above.

Figure 2A:
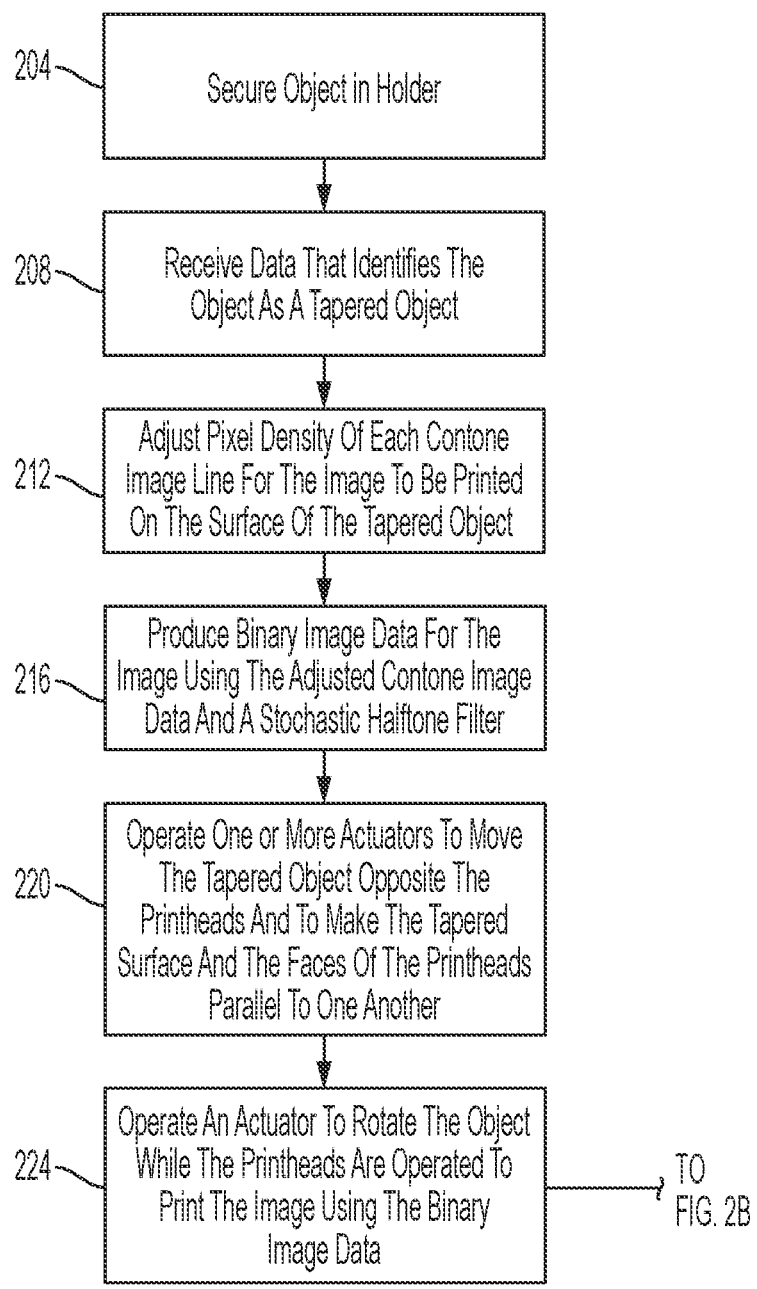
FIG. 2A and FIG. 2B are a flow diagram of a process for printing objects in the system of FIG. 1.
Figure 2B:
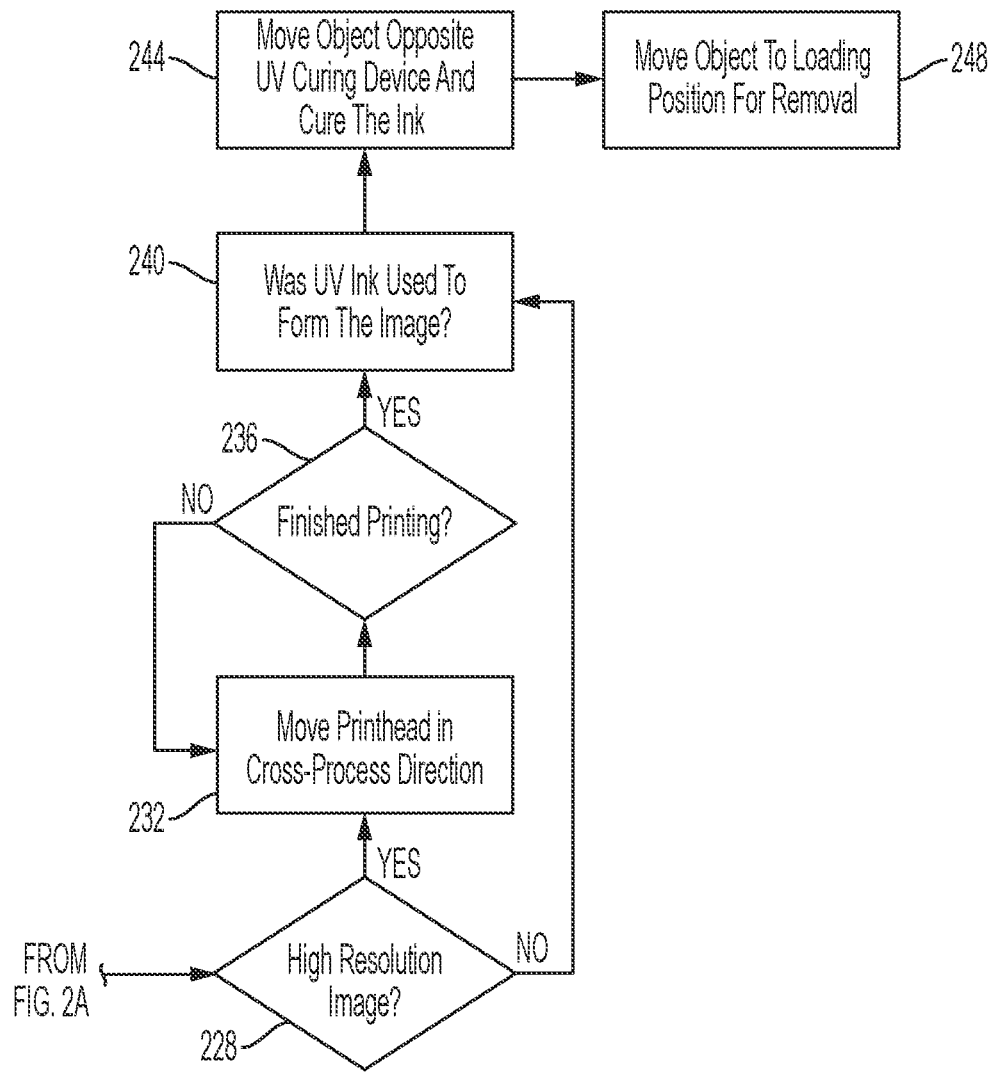
Figure 3:
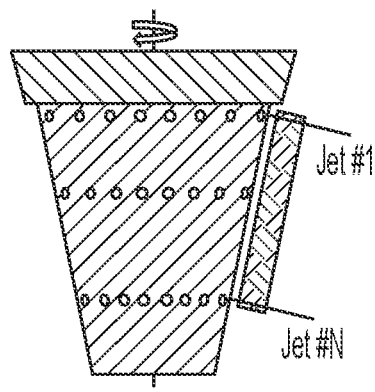
FIG. 3 depicts the positioning of a prior art printhead for forming an ink image on a tapered object.
Figure 4A:
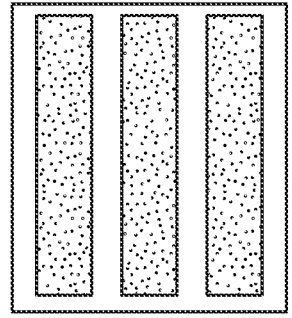
FIG. 4A depicts a uniform density image to be printed on a tapered object in the prior art.
Figure 4B:
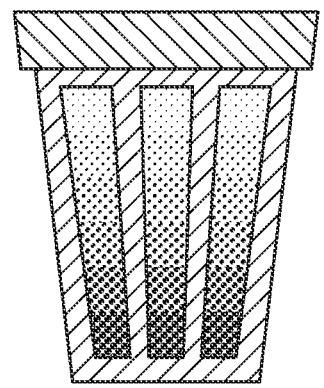
FIG. 4B depicts the actual prior art image printed on the tapered object using the unadjusted pixel data corresponding to the image shown in FIG. 4A.

A process for operating the printer 100 is shown in FIG. 2A and FIG. 2B. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 124 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

The process 200 begins with an object 104 being secured within the holder 108 (block 204). The controller receives data through a user interface that a tapered object is being printed (block 208). The controller then adjusts the pixel density for each line of an image to be formed on the object as the object rotates in front of the printhead array 112 (block 212). The image data is contone data in which each pixel value is a multi-bit value in a range, typically, of 0 to 255 for all of the colors the printhead is capable of printing, which are normally cyan, magenta, yellow, and black, although other or additional colors can be used in the system. The controller is configured to adjust the contone value of each pixel value by changing the original contone value in proportion to a ratio of the circumference of the object at the pixel's position on the object and the circumference of the object at the top of the image. In other words:

Cyan(currentPixel)Cyan(currentPixel)*Circumference(topPixel)/Circumference(currentPixel);

Magenta(currentPixel)=Magenta(currentPixel)*Circumference(topPixel)/Circumference(currentPixel);

Yellow(currentPixel)=Yellow(currentPixel)*Circumference(topPixel)/Circumference(currentPixel); and Black(currentPixel)=Black(currentPixel)*Circumference(topPixel)/Circumference(currentPixel).

As used in this document, the term "pixel density adjustment" means changing a contone data value for a pixel in an image using the ratio of the circumferences at the top of the image and at the current pixel's position. After the contone image data is modified, the contone data is filtered using a stochastic halftone filter to produce binary pixel data (block 216). As used in this document, the term "stochastic halftone filter" means an array of randomly distributed threshold values that are applied to contone data that has been modified by the pixel density adjustment percentage. Comparison of a contone data value to a corresponding threshold in the stochastic halftone filter results in a binary "1" or "0." That is, a binary value of one corresponds to the firing of the inkjet to eject an ink drop and a binary value of zero corresponds to an inkjet not being activated. Consequently, pixel density in the resulting image is the result of fewer or more ink drops being ejected rather than the volumes of the ink drops being adjusted. In contrast to the approach of using different drop sizes to print different regions of an image on a tapered object, the pixel density adjustment and stochastic halftone filtering of the adjusted pixel data yields a continuous modification of the image along the cross-process direction of the changing circumference in the object.

Continuing with the process shown in FIG. 2A and FIG. 2B, once the binary pixel data is produced, the controller operates the actuator 128 that is operatively connected to the holder 108 to move the object and the holder opposite the one or more printheads in the array 112 and positions the object and printhead array so the surface of the object and the face(s) of the one or more printheads 118 in the array 112 are parallel to one another (block 220). The controller 124 then operates the inkjets in the printheads using the binary pixel data to form at least a portion on the image on the object as the controller operates an actuator to rotate the object (block 224). If the image is to be higher resolution (block 228), then the controller 124 is configured to operate actuator 122 to move the one or more printheads in the cross-process direction so the one or more printheads eject ink drops between previously ejected ink drops in a previous pass to increase the resolution of the printed image (block 232). After all of the passes for printing the image are preformed (block 236), the controller 124 then determines whether the ink in the image requires UV curing (block 240). If it does, the controller operates the actuator 128 to position the object opposite the UV curing device 120 and then operates the device to cure the image (block 244). Otherwise, it operates the actuator 128 to return the object to the loading position for retrieval of the object (block 248). If the object was cured, the controller operates the actuator to return to the loading position after the curing is complete (block 248).

The approach of pixel density adjustment is useful not only for continuously tapered objects in a single direction, such as conical cups and the like, but also for objects having other contoured shapes such as hourglass shaped objects or other objects having irregularly varying circumferences in the cross-process direction. Since the circumference at each pixel position in the image is compared to the circumference at the top of the image for the pixel density adjustment disclosed herein, the pixel density adjustment is appropriate no matter the direction of the circumference variation.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method of operating a printing system comprising:
   operating with a controller an actuator operatively connected to a holder to move the holder and an object having a varying circumference within the holder to a position opposite at least one printhead in the printing system;
   operating with the controller the actuator to position a face of the at least one printhead parallel to a surface of an object and to rotate the object;
   modifying with the controller contone image data of an image to be printed on a surface of the object to adjust a pixel density of the image to be printed on the surface of the object;
   filtering with the controller the modified contone image data using a stochastic halftone filter to produce binary image data; and
   operating inkjets within the at least one printhead using the binary image data to form an image on the object with the varying circumference as the object rotates.

2. The method of claim 1 further comprising:
   adjusting with the controller a pixel density of a line of contone image values in the contone image data for an inkjet in the at least one printhead, the line of contone image data corresponding to a first portion of the surface of the object having a circumference that is greater than or less than a second portion of the surface of the object.

3. The method of claim 2 wherein the second portion of the surface of the object is located at a position where an uppermost line of the image is formed on the object.

4. The method of claim 3 further comprising:
adjusting with the controller each contone image value for the inkjet by multiplying each contone image value by a ratio of the circumference at the second portion to the circumference at the first portion.

5. The method of claim 4 further comprising:
operating with the controller the at least one printhead to eject more than one color of ink.

6. The method of claim 5 further comprising:
operating with the controller another actuator to move the at least one printhead by a predetermined distance in a cross-process direction; and
operating with the controller the inkjets within the at least one printhead after movement of the printhead by the predetermined distance to increase a resolution of the image formed on the object in the cross-process direction.

7. The method of claim 6 further comprising:
repeating with the controller the operation of the other actuator to move the at least one printhead by the predetermined distance and the operation of the inkjets for a predetermined number of times.

8. The method of claim 7 further comprising:
receiving from an user interface with the controller data that identifies the object within the holder.

9. The method of claim 8 further comprising:
operating with the controller the at least one printhead to eject ink drops with no more than two ink drop volumes.

10. The method of claim 9 further comprising:
operating with the controller an ultraviolet (UV) lamp emit light in an UV range to cure UV curable marking material ejected onto the surface of the object from the at least one printhead.

11. A method of operating a printing system comprising:
operating a first actuator with a controller to move a holder and an object that has a varying circumference held by the holder along a support to a position opposite at least one printhead in the printing system so a face of the at least one printhead is parallel to a surface of the object held by the holder and to rotate the object held by the holder in a process direction;
modifying contone image data corresponding to a first line of an image to be printed on the surface of the object as the object rotates, the contone image data being modified by using a pixel density adjustment for pixels of the first line in the contone image data;
producing binary image data of the first line of the image to be printed on the surface of the object as the object rotates, the binary image data being generated with the modified contone image data for the first line of the image and a stochastic halftone filter; and
operating inkjets within the at least one printhead using the produced binary image data to form the first line of the image on a first portion of the object having a first circumference as the object rotates.

12. The method of claim 11 further comprising:
using the pixel density adjustment to modify contone image data for pixels of a second line of the image, the second line of the image to be printed on a second portion of the surface of the object that has a second circumference that is different than the first circumference of the first portion of the surface of the object.

13. The method of claim 12 wherein the second line of the image is located at a position where an uppermost line of the image is formed on the object.

14. The method of claim 13 further comprising:
performing the pixel density adjustment by multiplying the contone image data for each pixel in the first line and each pixel in the second line by a ratio of the first circumference to the second circumference.

15. The method of claim 14 further comprising:
operating inkjets in the at least one printhead to eject more than one color of ink to form the first line and the second line of the image.

16. The method of claim 15 further comprising:
operating a second actuator to move the at least one printhead by a predetermined distance in a cross-process direction; and
operating the inkjets within the at least one printhead after movement of the printhead by the predetermined distance in the cross-process direction to increase a resolution of the image formed on the object in the cross-process direction.

17. The method of claim 16 further comprising:
repeating the operation of the second actuator to move the at least one printhead by the predetermined distance and the operation of the inkjets for a predetermined number of times.

18. The method of claim 17 further comprising:
receiving data that identifies the object within the holder from a user interface.

19. The method of claim 18 further comprising:
operating the inkjets in the at least one printhead to eject ink drops with no more than two ink drop volumes.

20. The method of claim 19 further comprising:
operating an ultraviolet (UV) lamp to emit light in an UV range to cure UV curable marking material ejected from the inkjets of the at least one printhead.

* * * * *